Jan. 8, 1952     K. W. NEBEL     2,581,694
METAL PIERCING AND CUTTING SHEARS
Filed June 1, 1949     4 Sheets-Sheet 1
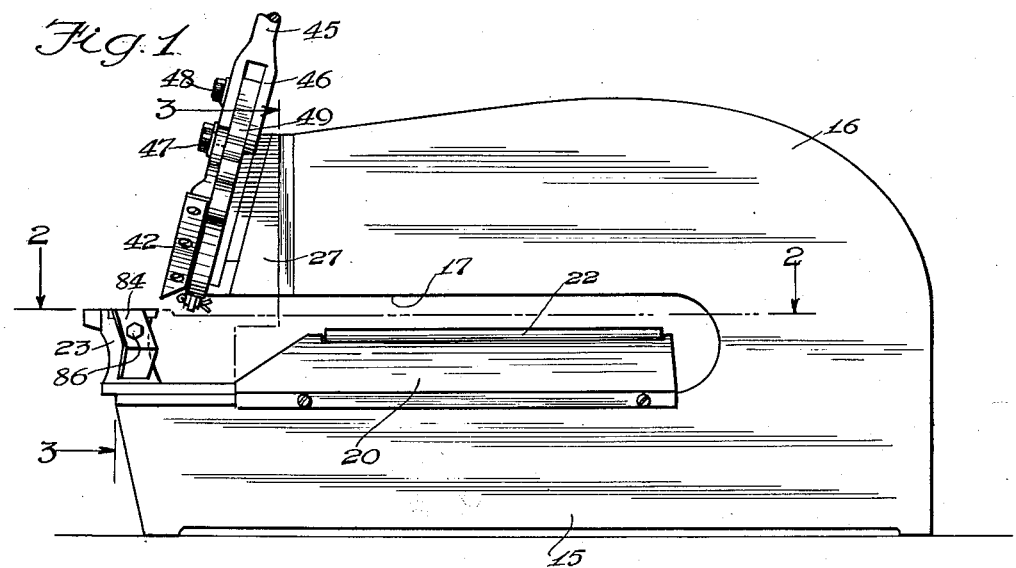
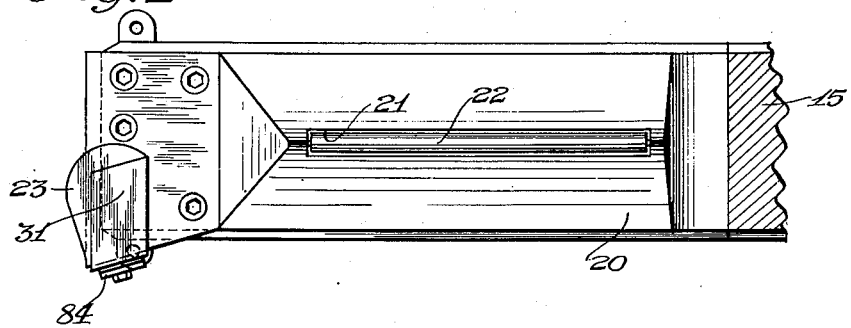
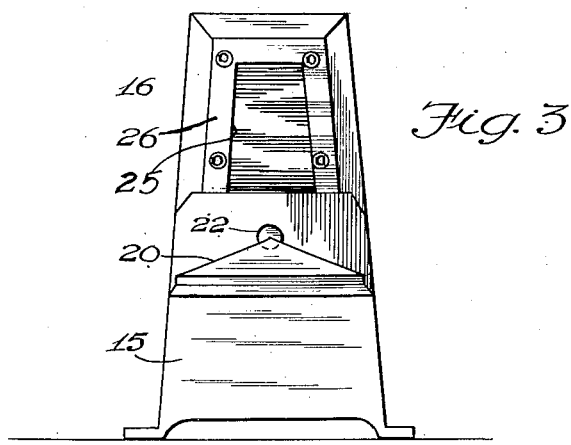
INVENTOR:
Kurt W. Nebel
BY Stevens & Batchelor
Attorneys.

Jan. 8, 1952  K. W. NEBEL  2,581,694
METAL PIERCING AND CUTTING SHEARS
Filed June 1, 1949  4 Sheets-Sheet 3

INVENTOR.
Kurt W. Nebel
BY
Stewart Batchelor
Attorneys.

Jan. 8, 1952 K. W. NEBEL 2,581,694
METAL PIERCING AND CUTTING SHEARS
Filed June 1, 1949 4 Sheets-Sheet 4
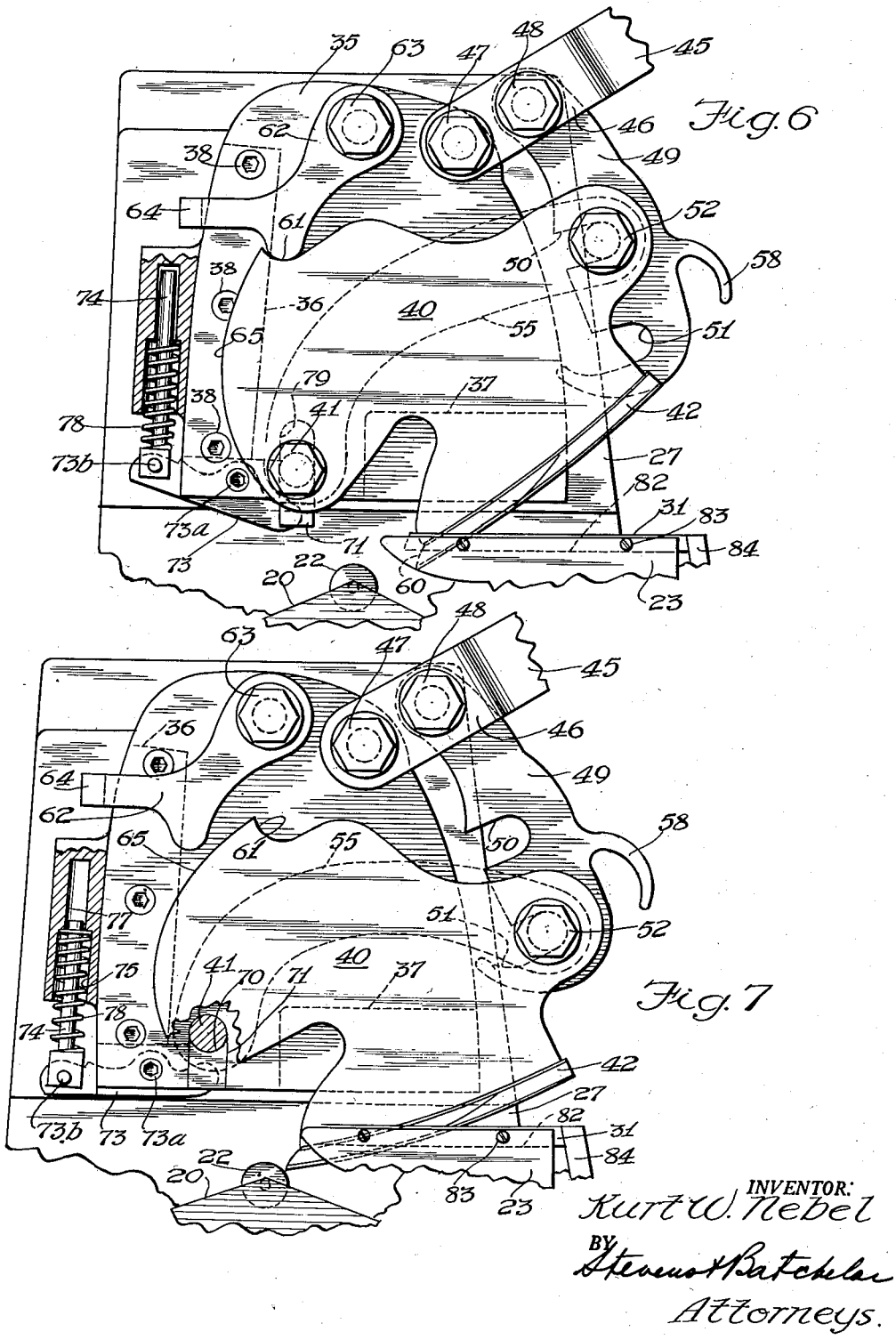

Patented Jan. 8, 1952

2,581,694

UNITED STATES PATENT OFFICE 2,581,694

METAL PIERCING AND CUTTING SHEARS

Kurt W. Nebel, Chicago, Ill.

Application June 1, 1949, Serial No. 96,570

11 Claims. (Cl. 164—46)

My invention relates to hand operated shears designed for cutting sheet metal, and more particularly to the type which have means for starting a cut from within the surface of the sheet by piercing the latter.

It is one object of the present invention to provide a mechanism which imposes a direct influence on the point of the sheer blade in the direction of the work sheet, whereby to procure the piercing action with a minimum of effort.

A further object is to provide a shear with means to adjust it for piercing and cutting, or for cutting without piercing.

Another object is to design the shear in a manner to secure a high power leverage and enable relatively heavy work to be negotiated.

A still further object is to employ a bed for the work which facilitates the lateral movement thereof in case it is trained or turned as the cutting is done.

An important object is to construct the novel shear along lines of sturdiness, yet so compactly as to have it occupy a small space on a stand or other support and be easily movable from place to place.

With the above objects in view, and any others which may suggest themselves from the description to follow, a better understanding of the invention may be had by reference to the accompanying drawings, in which—

Fig. 1 is a side elevation of the shear;

Figs. 2 and 3 are, respectively, sections on the lines 2—2 and 3—3 of Fig. 1;

Fig. 6 is a view similar to Fig. 5, showing the working parts advanced to pierce a work sheet;

Fig. 7 is a similar view showing the working parts readjusted and advanced still further to cut the work sheet with a shearing action.

Figure 4:
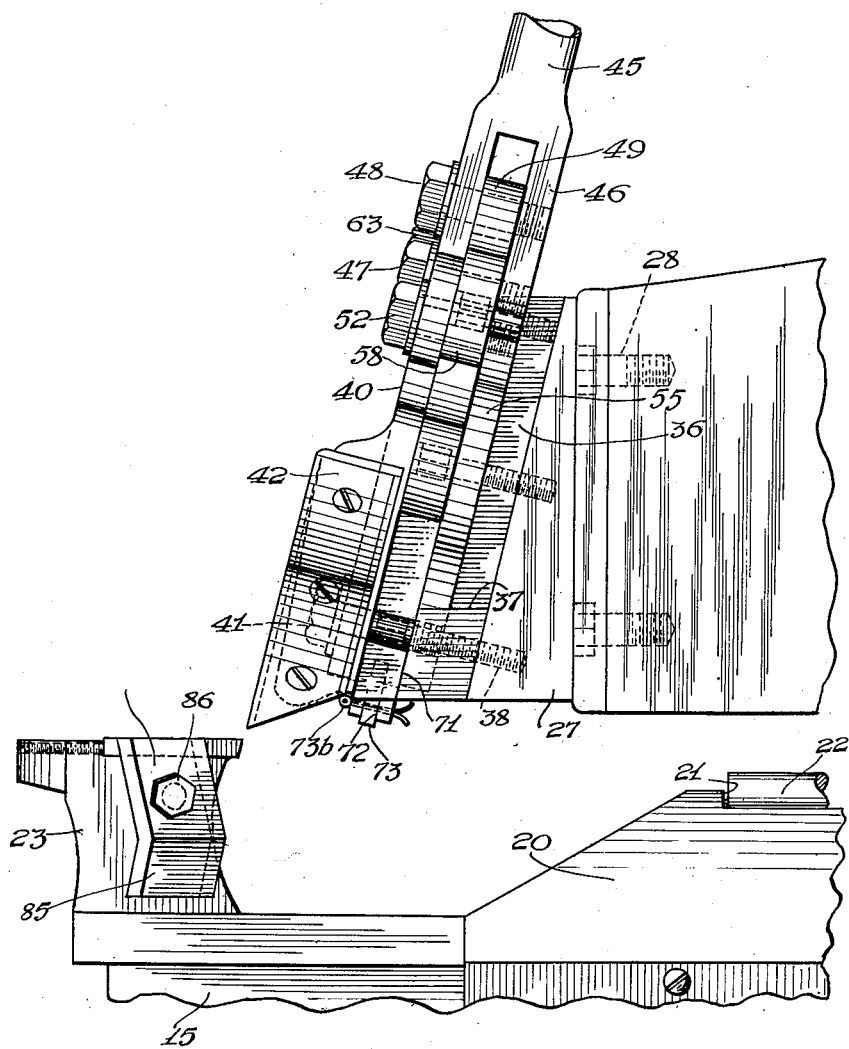
Fig. 4 is an enlarged duplication of the left-hand portion of Fig. 1.

Referring specifically to the drawings, 15 denotes the base of the shear; the same rising from the rear to form a headpiece 16; and the latter is spaced from the base to form an entrance or throat 17.

In the throat 17 the base receives a platform 20 which is ridged from side to side to create wide approaches for the work (not shown); and the vertex of the platform is recessed longitudinally from front to rear, as indicated at 21, to journal a roller 22. Thus, as the work sheet is inserted over the platform or moves from side to side as the shearing operation is in process, the sheet rides on the roller and moves with greater facility.

At the front the headpiece 16 carries the mechanism which supports and operates the upper or movable blade of the shear, while the base is formed with an anvil 23 which supports the fixed blade thereof. The headpiece 16 is hollow to save weight; and its front end has an opening 25 lined at the top and sides by face flanges 26 for the application of the mechanism referred to. Since the latter rises with a rearward tilt—as is apparent in Fig. 1—to position the upper shear blade accordingly, the flanges 26 of the headpiece receive a wedge-shaped face plate 27 by means of bolts 28 before the mechanism is applied.

The mechanism for the upper blade is carried by a massive supporting plate 35 attached in front of the face plate 27 through the agency of a back spacer 36 and a bottom spacer 37, a series of bolts 38 being applied by way of sockets 39 in the plate 35 to pass through the spacers and into the plate 27. A frontal cutter plate 40 is mounted on a pivotal bolt 41 to swing from the position of Fig. 5 to that of Fig. 6 and beyond; and the upper blade 42 is removably attached to the cutter plate 40. In a general sense, it is apparent that the upper blade 42 takes a shearing stroke relative to the lower or fixed blade 31, which is supported by the anvil 23, such action being common in shears of the type under consideration.

The swing of the cutter plate 40 is induced by a long hand lever 45, whose outer portion has been shown broken away to save space, the inner end of the lever being in the shape of a fork 46, which straddles the upper portion of the supporting plate 35; and a pivotal bolt 47 connects the lower portion of the fork with the supporting plate. The upper portion of the fork also receives a cross-bolt 48 to which the upper end of a control link 49 is pivotally connected, the link being in the same plane as the supporting plate 35. The inner edge of the link 49 has medial and lower slots 50 and 51 designed for selective application to a cross-bolt 52. The latter is carried between the cutter plate 40 and the upper end of a diagonal arm 55 extending behind the supporting plate, the lower end of the arm pivoting on the bolt 41.

Figures 5, 8:
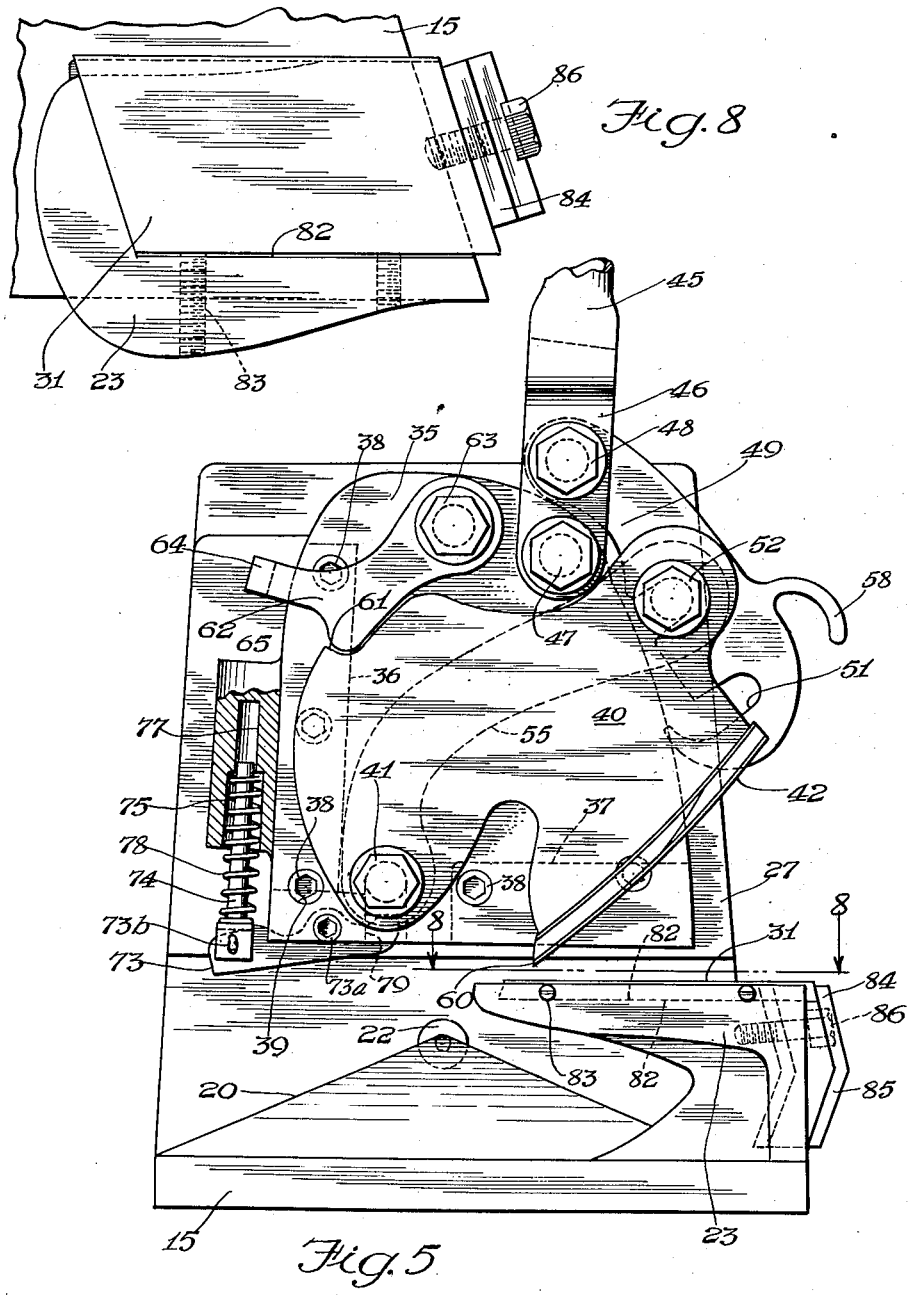
Fig. 5 is a front elevation of the shear—or as seen from the left-hand side of Fig. 4—showing the working parts in the position before receiving the work.
Fig. 8 is a section on the line 8—8 of Fig. 5.

Connected as in Fig. 5, the control link 49 locates the upper blade 42 poised high—at approximately 45 degrees—at the beginning of its stroke to take the downward course previously outlined. However, the link may be drawn free of the bolt 52 by means of a handle 58 to permit the assembly of the cutter plate 40, bolt 52 and diagonal arm 55 to be swung down until the slot 51 can be applied to the bolt. Now the blade 42 is located at a lower angle, as seen in Fig. 7; and the stroke of the shear consequently accomplishes a longer cut in relation to the fixed blade 31.

Since it is the primary object of the improved shear to pierce the work sheet when the cutting is started within the marginal limits of the sheet, the starting end of the upper blade is pointed as indicated at 60; and the blade is mounted in a manner to lower the point and pierce the work as the operative swing of the blade is instituted. In order to do this the bolt 41 is floatingly disposed; and the trailing edge of the cutter plate 40 is formed with a sunken ledge 61 in which the free end of a detent 62 rests. The opposite end of the detent is pivoted at a higher point to a bolt 63 directed into the supporting plate 35. Initially— that is, before the operation of the shear is instituted—the cutter plate 40 and detent 62 are positioned as in Fig. 5. However, when the hand lever 45 is drawn part-way down—as in Fig. 6— the lateral departure of the ledge 61 allows the detent to assume a steeper angle while the free end of the detent is retained in the hollow of the ledge. The detent is thus caused to impinge downwardly on the trailing portion of the cutter plate 40 with the effect of sinking the pointed edge 60 of the blade 42 into and through the work as suggested in Fig. 6.

The hand lever 45 can now be pulled to continue the cut, the work sheet being held still if the cut is to be straight, or swung in one or the other direction if the cut is to be irregular or curved. As this is done and the cutter plate 40 swings beyond the position illustrated in Fig. 6, the ledge 61 trips and releases the detent 62, relieving the pointed end of the blade 42 of downward pressure, and enabling the shear to be used freely as a conventional shear. The detent has a side hook 64 which meets the adjoining edge of the supporting plate 35 as a stop against the excessive inward swing of the detent; and on the return of the cutter plate 40, the trailing edge thereof is formed as a cam 65 to raise the detent until it again falls into the ledge 61.

While any suitable means may be employed to floatingly dispose the bottom bolt 41, the simple and readily accessible device illustrated is preferred. Thus, the bolt rests in the hollow 70 of a substantially vertical pin 71 which is divided from the bottom as indicated at 72. A lever 73 below the pin is pivoted intermediate its ends on a cross-pin 73a, carried by the supporting plate 35, the inner end of the lever extending into the slot 72 of the pin 71. The outer end of the lever makes a pivotal connection at 73b with the lower end of a plunger 74 which rises into a cavity 75 made in an outward extension 76 of the supporting plate 35; and the plunger continues partly into a bore 77 extended from the cavity 75 and of a lesser cross section than the same. A compression spring 78 is coiled around the plunger 74 between its lower end and the shoulder defining the upper end of the cavity 75. The pin 71 is vertically slidable in a slot 79 made in the bottom of the supporting plate; and the mechanism just described acts through the pin 71 to normally maintain the bolt 41 in the highest or normal position to afford the upper blade 42 ample clearance from the work. However, when the cutter plate receives the depressing influence of the detent 62, the mechanism of the lever 73 acts as a yieldable control for the bolt 41 and the parts supported by it.

The holder for the lower or fixed blade 31 will now be described. Thus, the anvil 23 is recessed from the top—as indicated at 82—to seat the blade 31 with its inner end and parallel sides; and set screws 83 are directed from the anvil to one of the said sides to clamp the blade on the opposite side. The outer end of the blade is pressed inwardly by the upper leg 84 of an arched clamp 85, the latter being tightened against the blade and the anvil by a bolt 86.

It will now be apparent that the improved shear procures the initial piercing of the work in a region where only a fraction of the manual effort to operate the shear is required; and that a device is located in that region which automatically imposes a powerful pressure on the blade point to accomplish the piercing actiton. Thus, the most difficult step in the operation— the piercing of the work—is accomplished through power pressure by the mere manual advance of the band lever. Further, with the piercing accomplished, the power pressure ceases, and the cutting unit is free to be swung with a minimum of effort to continue the shearing operation. Further, the power pressure element is a simple detent which requires no manual adjustment or attention, and which resets itself as the shear is returned to the open position. Further, a yieldable device is provided to boost the piercing element to an ample clearance above the work the moment the shear has accomplished the piercing action, the piercing element remaining in the elevated position until the next piercing operation is negotiated. Further, the connecting link 49 is adjustable to set the movable blade either in a position to receive the piercing pressure, or at a low angle for ordinary cutting, all without affecting the power pressure element. Finally, the novel shear is not complicated or perceptibly enlarged by the inclusion of the pressure piercing mechanism.

While I have described the invention along specific lines, various minor changes or refinements may be made therein without departing from its principle, and I reserve the right to employ all such changes and refinements as may come within the scope and spirit of the appended claims.

I claim:

1. A metal cutting shear comprising a bed, a fixed blade carried by the same, a support above the bed, a cutter plate mounted pivotally alongside the support and designed to be swung toward and from said fixed blade, an upper blade carried by the cutter plate and disposed in angularly poised and spaced relation to said fixed blade when the cutter plate is at the origin of its movement, the starting end of the upper blade being pointed, and means effective on the operative swing of said cutter plate to impose a direct thrust on said starting end toward the work sheet with the effect of piercing the latter, said means being a detent pivoted from said support at a point above the cutter plate and adapted to seat at an angle in a ledge formed in the trailing edge of the cutter plate, the operative movement of the latter inducing the downward swing of said detent and automatic downward pressure thereof on the cutter plate, the continued swing of the cutter plate tripping the detent to a position releasing the cutter plate.

2. A metal cutting shear comprising a bed, a fixed blade carried by the same, a support above the bed, a cutter plate mounted pivotally alongside the support and designed to be swung toward and from said fixed blade, an upper blade carried by the cutter plate and disposed in angularly poised and spaced relation to said fixed blade when the cutter plate is at the origin of its movement, the starting end of the upper blade being pointed, and means effective on the operative swing of said cutter plate to impose a direct thrust on said starting end toward the work sheet with the effect of piercing the latter, said means being a detent pivoted from said support at a point above the cutter plate and adapted to seat at an angle in a ledge formed in the trailing edge of the cutter plate, the operative movement of the latter inducing the downward swing of said detent and automatic downward pressure thereof on the cutter plate, the continued swing of the cutter plate tripping the detent to a position releasing the cutter plate, and a cam formed on said trailing edge to reseat the detent in said ledge on the return movement of the cutter plate.

3. A metal cutting shear comprising a bed, a fixed blade carried by the same, a support above the bed, a cutter plate mounted pivotally alongside the support and designed to be swung toward and from said fixed blade, an upper blade carried by the cutter plate and disposed in angularly poised and spaced relation to said fixed blade when the cutter plate is at the origin of its movement, the starting end of the upper blade being pointed, and means effective on the operative swing of said cutter plate to impose a direct thrust on said starting end toward the work sheet with the effect of piercing the latter, said means being a detent pivoted from said support at a point above the cutter plate and adapted to seat at an angle in a ledge formed in the trailing edge of the cutter plate, the operative movement of the latter inducing the downward swing of said detent and automatic downward pressure thereof on the cutter plate, the continued swing of the cutter plate tripping the detent to a position releasing the cutter plate, a cam formed on said trailing edge to reseat the detent in said ledge on the return movement of the cutter plate, and means to check the excessive down-swing of the detent.

4. A metal cutting shear comprising a bed, a fixed blade carried by the same, a support above the bed, a cutter plate mounted pivotally alongside the support and designed to be swung toward and from said fixed blade, an upper blade carried by the cutter plate and disposed in angularly poised and spaced relation to said fixed blade when the cutter plate is at the origin of its movement, the starting end of the upper blade being pointed, and means effective on the operative swing of said cutter plate to impose a direct thrust on said starting end toward the work sheet with the effect of piercing the latter, said means being a detent pivoted from said support at a point above the cutter plate and adapted to seat at an angle in a ledge formed in the trailing edge of the cutter plate, the operative movement of the latter inducing the downward swing of said detent and automatic downward pressure thereof on the cutter plate, the continued swing of the cutter plate, a cam formed on said trailing edge to reseat the detent in said ledge on the return movement of the cutter plate, and a hook extended from the detent for engagement with an adjacent edge of said support to lock the detent from excessive downward swing.

5. A metal cutting shear comprising a bed, a fixed blade carried by the same, a support above the bed, a cutter plate mounted pivotally alongside the support and designed to be swung toward and from said fixed blade, an upper blade carried by the cutter plate and disposed in angularly poised and spaced relation to said fixed blade when the cutter plate is at the origin of its movement, the starting end of the upper blade being pointed, and means effective on the operative swing of said cutter plate to impose a direct thrust on said starting end toward the work sheet with the effect of piercing the latter, and yieldable means to control the lowering movement of the cutter plate.

6. A metal cutting shear comprising a bed, a fixed blade carried by the same, a support above the bed, a cutter plate mounted pivotally alongside the support and designed to be swung toward and from said fixed blade, an upper blade carried by the cutter plate and disposed in angularly poised and spaced relation to said fixed blade when the cutter plate is at the origin of its movement, the starting end of the upper blade being pointed, and means effective on the operative swing of said cutter plate to impose a direct thrust on said starting end toward the work sheet with the effect of piercing the latter, and means to raise said cutter plate when it has advanced beyond the piercing zone.

7. A metal cutting shear comprising a bed, a fixed blade carried by the same, a support above the bed, a cutter plate mounted pivotally alongside the support and designed to be swung toward and from said fixed blade, an upper blade carried by the cutter plate and disposed in angularly poised and spaced relation to said fixed blade when the cutter plate is at the origin of its movement, the starting end of the upper blade being pointed, and means effective on the operative swing of said cutter plate to impose a direct thrust on said starting end toward the work sheet with the effect of piercing the latter, and means to automatically raise said cutter plate when it has advanced beyond the piercing zone.

8. A metal cutting shear comprising a bed, a fixed blade carried by the same, a support above the bed, a cutter plate mounted pivotally alongside the support and designed to be swung toward and from said fixed blade, an upper blade carried by the cutter plate and disposed in angularly poised and spaced relation to said fixed blade when the cutter plate is at the origin of its movement, the starting end of the upper blade being pointed, and means effective on the operative swing of said cutter plate to impose a direct thrust on said starting end toward the work sheet with the effect of piercing the latter, a cross-element on which the cutter plate is pivoted, and a spring-backed booster mechanism for said cross-element.

9. A metal cutting shear comprising a bed, a fixed blade carried by the same, a support above the bed, a cutter plate mounted pivotally alongside the support and designed to be swung toward and from said fixed blade, an upper blade carried by the cutter plate and disposed in angularly poised and spaced relation to said fixed blade when the cutter plate is at the origin of its movement, the starting end of the upper blade being pointed, and means effective on the operative swing of said cutter plate to impose a direct thrust on said starting end toward the work sheet with the effect of piercing the latter, said support having a recess from the bottom, a cross-bolt slidable in said recess on which said cutter plate is pivoted, a chambered pin seating said cross-bolt and also slidable in said recess, a lever pivoted intermediate its ends to the support and having its inner end under said pin, and a spring-backed plunger effective on the opposite end of the lever to impart boosting action with the first-mentioned end thereof on said pin.

10. A metal cutting shear comprising a bed, a fixed blade carried by the same, a support above the bed, a cutter plate mounted pivotally alongside the support and designed to be swung toward and from said fixed blade, an upper blade carried by the support and disposed in angularly poised and spaced relation to said fixed blade when the cutter plate is at the origin of its movement, a hand lever pivoted to the support at a point above said cutter plate, a cross-bolt carried by the latter in its advancing zone, and a connecting link pivoted with one end to said lever and extending to the region of said cross-bolt, said link having longitudinally spaced entrance slots designed for selective application to said cross-bolt, whereby to connect the cutter plate at different heights with said hand lever.

11. The structure of claim 10, and an arm extending from the pivoting zone of the cutter plate along the opposite side of said support and forming a companion receptacle for said cross-bolt.

KURT W. NEBEL.

REFERENCES CITED

The following references are of record in the file of this patent:

UNITED STATES PATENTS

| Number | Name | Date |
|---|---|---|
| 710,310 | Wesselmann | Sept. 30, 1902 |

FOREIGN PATENTS

| Number | Country | Date |
|---|---|---|
| 370,641 | Germany | Mar. 5, 1923 |